United States Patent
Indurthivenkata et al.

(10) Patent No.: US 10,474,566 B2
(45) Date of Patent: Nov. 12, 2019

(54) MODEL INTEGRATION TOOL

(71) Applicant: EQUIFAX INC., Atlanta, GA (US)

(72) Inventors: Rajesh Indurthivenkata, Cumming, GA (US); Lalithadevi Venkataramani, Johns Creek, GA (US); Aparna Somaka, Swanee, GA (US); Xingjun Zhang, Suwanee, GA (US); Matthew Turner, Cumming, GA (US); Bhawana Koshyari, Alpharetta, GA (US); Vijay Nagarajan, Cumming, GA (US); James Reid, Cumming, GA (US); Nandita Thakur, Alpharetta, GA (US)

(73) Assignee: Equifax Inc., Atlanta, GA (US)

( * ) Notice: Subject to any disclaimer, the term of this patent is extended or adjusted under 35 U.S.C. 154(b) by 0 days.

(21) Appl. No.: 15/750,363

(22) PCT Filed: Aug. 5, 2016

(86) PCT No.: PCT/US2016/045822
§ 371 (c)(1),
(2) Date: Feb. 5, 2018

(87) PCT Pub. No.: WO2017/024242
PCT Pub. Date: Feb. 9, 2017

(65) Prior Publication Data
US 2019/0012257 A1 Jan. 10, 2019

Related U.S. Application Data

(60) Provisional application No. 62/201,258, filed on Aug. 5, 2015.

(51) Int. Cl.
*G06F 9/44* (2018.01)
*G06F 11/36* (2006.01)
(Continued)

(52) U.S. Cl.
CPC ............ G06F 11/3692 (2013.01); G06F 8/10 (2013.01); G06F 8/35 (2013.01); G06F 11/3604 (2013.01); G06F 11/3696 (2013.01)

(58) Field of Classification Search
CPC .................................................. G06F 11/3692
(Continued)

(56) References Cited

U.S. PATENT DOCUMENTS

| | | | | |
|---|---|---|---|---|
| 7,360,215 B2 * | 4/2008 | Kraiss | ........... | G06Q 99/00 703/22 |
| 7,373,633 B2 * | 5/2008 | Kraiss | ........... | G06F 9/445 717/110 |

(Continued)

OTHER PUBLICATIONS

DTREG; "Predictive Modeling Software"—Phillip H. Sherrod; 2003.*

(Continued)

*Primary Examiner* — Francisco J Aponte
(74) *Attorney, Agent, or Firm* — Kilpatrick Townsend & Stockton LLP

(57) ABSTRACT

Certain aspects involve building and debugging models for generating source code executed on data-processing platforms. A target data-processing platform is identified that requires bin ranges for modeling coefficients and reason codes for input attributes. A processor outputs source code, which is generated from a modeling code, in a programming language used by the target data-processing platform.

17 Claims, 9 Drawing Sheets

(51) Int. Cl.
*G06F 8/10* (2018.01)
*G06F 8/35* (2018.01)

(58) Field of Classification Search
USPC .......................................................... 717/124
See application file for complete search history.

(56) References Cited

U.S. PATENT DOCUMENTS

| | | | | |
|---|---|---|---|---|
| 8,417,715 | B1* | 4/2013 | Bruckhaus | G06Q 10/04 |
| | | | | 707/758 |
| 8,869,100 | B1 | 10/2014 | Mott et al. | |
| 9,471,452 | B2* | 10/2016 | McElhinney | G06F 11/0751 |
| 9,582,759 | B2* | 2/2017 | Jayaraman | G06N 5/02 |
| 9,684,490 | B2* | 6/2017 | Vadapandeshwara | G06F 8/30 |
| 10,169,135 | B1* | 1/2019 | Pandey | G06F 11/079 |
| 10,176,032 | B2* | 1/2019 | Horrell | G06F 11/0751 |
| 2004/0236758 | A1* | 11/2004 | Medicke | G06F 16/2465 |
| 2004/0249867 | A1* | 12/2004 | Kraiss | G06F 9/44536 |
| 2004/0250255 | A1 | 12/2004 | Kraiss et al. | |
| 2006/0200549 | A1* | 9/2006 | Soto | G06Q 10/04 |
| | | | | 709/224 |
| 2008/0127127 | A1* | 5/2008 | Chitgupakar | G06F 8/51 |
| | | | | 717/137 |
| 2008/0167843 | A1* | 7/2008 | Morrison | G06F 17/18 |
| | | | | 703/2 |
| 2012/0096426 | A1 | 4/2012 | Sarafudinov | |
| 2012/0271612 | A1 | 10/2012 | Barsoum et al. | |
| 2015/0120758 | A1* | 4/2015 | Cichosz | G06F 16/25 |
| | | | | 707/748 |
| 2015/0134401 | A1* | 5/2015 | Heuer | G06Q 30/0202 |
| | | | | 705/7.29 |
| 2015/0205602 | A1* | 7/2015 | Prismon | G06F 8/71 |
| | | | | 717/121 |
| 2015/0293755 | A1* | 10/2015 | Robins | G06F 9/44526 |
| | | | | 717/104 |
| 2016/0055427 | A1* | 2/2016 | Adjaoute | G06N 20/00 |
| 2016/0371406 | A1* | 12/2016 | Nicholas | G06F 17/5009 |
| 2018/0373988 | A1* | 12/2018 | Dhanyamraju | G06N 5/02 |

OTHER PUBLICATIONS

Flint et al., "Scorecard Element in PMML 4.1 Provides Rich, Accurate Exchange of Predictive Models for Improved Business Decisions", The 17th ACM SIGKDD International Conference on Knowledge Discovery and Data Mining https://kdd11pmml.files.wordpress.com/2011/09/p2_flint_guazzelli_kdd_20112.pdf, Aug. 21, 2011, pp. 16-20.

International Patent Application No. PCT/US2016/045822, "International Search Report and Written Opinion", dated Nov. 11, 2016, 15 pages.

European Application No. EP16833945.5, "Extended European Search Report", dated Feb. 15, 2019, 14 pages.

Guazzelli et al., "Efficient Deployment of Predictive Analytics through Open Standards and Cloud Computing", ACM SIGKDD Explorations Newsletter, Association for Computing Machinery, Inc., vol. 1, No. 1, Nov. 16, 2009, 7 pages.

Guazzelli et al., "PMML: An Open Standard for Sharing Models", The R Journal, vol. 1, No. 1 Available Online at: https://journal.r-project.org/archive/2009/RJ-2009-010/RJ-2009-010.pdf, May 1, 2009, 6 pages.

Nathan et al., "Pattern: PMML for Cascading and Hadoop", XP055553678, Available online at URL:https://kdd13pmml.files.wordpress.com/2013/07/pattern.pdf, Aug. 13, 2013, 7 pages.

Pechter, "Conformance Standard for the Predictive Model Markup Language", Proceedings of the 4th International Workshop on Data Mining Standards, Services and Platforms, Aug. 20, 2006, 8 pages.

* cited by examiner

Select Attribute

| | Attribute Id | Description |
|---|---|---|
| ○ | 998 | Inquiry Fails eID Standard Quality Checks |
| ○ | 999 | System is unavailable |
| ○ | AA0001 | Bad SSN in client inquiry |
| ○ | AA0002 | Bad Addr in client inquiry |
| ○ | AA0003 | Bad Ph in client inquiry |
| ○ | AA0004 | Bad Name in client inquiry |
| ○ | AA0005 | Bad DOB in client inquiry |
| ○ | AA0006 | Stated age of consumer (in years) |
| ○ | AF1001 | Address fraud list match on CID |
| ○ | AF1002 | Address fraud list match on SSN | iFS Attributes — 302

304

« ‹ 1 2 3 4 5 6 7 8 9 10 ▲» (1 of 36) 10 ‹›

Save   Cancel

SAS ATTRIBUTE MAPPING

| Attribute Id | Description | SAS Name | Points |
|---|---|---|---|
| ▶ | | BPFLAG1 | 1.981160309 |
| ▶ | | BPFLAG2 | 1.981160309 |
| ▶ | | CLU1 | -0.013453711 |

402 (Description column), 404 (Points column)

FIG. 5

| Attribute Id and Description (502) | Max Points | Bin Range (504) | Points (506) | Bin Type (Original) (508) | Transformation (510) | Reason Code (512) |
|---|---|---|---|---|---|---|
| ▶ | 1.981160309 | 0 | 1.981160309 | Yes ▶ | | R01 ▶ |
| 1001 | | | 1.981160309 | No ▶ | (1/("1001"))^1.981160309 | ▶ |
| Select Attribute | | | | | | |
| Remove | | | | | Editor | |

[+] Add a New Bin Range

| A | B | C | D | E | F | G | H | I | J | K | L | M | N | O | P | Q | R | S | T | U | V | W |
|---|---|---|---|---|---|---|---|---|---|---|---|---|---|---|---|---|---|---|---|---|---|---|
| Record# | Expected | Expected | Expected | Expected | Expected | 3011 | 3796 | 3807 | 3812 | 3813 | 3903 | 3002 | 3909 | 3935 | 3100 | 91 | 3113 | 3159 | 3177 | 3181 | 3188 | 3224 |
| 1 | 363 | C91 | 203 | | | 98 | 99 | 99 | 9999 | 9999 | 9 | 1 | 8 | 3 | 0 | 0 | 264 | 34148 | 1 | 0 | 9999996 | 0 |
| 17 | 308 | C91 | 203 | 304 | 109 | 2 | 7 | 7 | 9998 | 9998 | 0 | 1 | 8 | 3 | 0 | 0 | 153 | 9999998 | 2 | 9999996 | 9999996 | 0 |
| 35 | 333 | C91 | 203 | 109 | | 99 | 8 | 8 | 9998 | 9998 | 0 | 1 | 8 | 3 | 0 | 0 | 114 | 18171 | 0 | 9999996 | 9999998 | 0 |
| 55 | 338 | C91 | 203 | 109 | | 99 | 1 | 1 | 9999 | 9999 | 9 | 1 | 8 | 3 | 0 | 0 | 267 | 45950 | 1 | 0 | 9999996 | 0 |
| 56 | 347 | C91 | 304 | | | 1 | 99 | 99 | 9998 | 9998 | 0 | 1 | 8 | 3 | 0 | 0 | 105 | 9999998 | 1 | 0 | 9999997 | 4 |
| 100 | 337 | C91 | 203 | 109 | | 99 | 3 | 3 | 9999 | 9999 | 9 | 1 | 8 | 3 | 0 | 0 | 71 | 56166 | 1 | 9999996 | 9999998 | 0 |
| 101 | 338 | C91 | 203 | 109 | | 99 | 1 | 1 | 9998 | 9998 | 0 | 1 | 8 | 3 | 0 | 0 | 306 | 9999998 | 5 | 1445 | 9999996 | 0 |
| 115 | 363 | C91 | 203 | | | 98 | 99 | 99 | 9999 | 9999 | 9 | 1 | 8 | 3 | 0 | 0 | 264 | 9999996 | 3 | 0 | 9999998 | 0 |
| 118 | 338 | C91 | 203 | 109 | | 99 | 2 | 2 | 9998 | 9998 | 0 | 1 | 8 | 3 | 1 | 0 | 9998 | 9999998 | 2 | 9999997 | 9999998 | 98 |
| 41 | 325 | C92 | 304 | 299 | 36 | 6 | 99 | 99 | 9998 | 9998 | 1 | 1 | 8 | 3 | 0 | 0 | 264 | 34148 | 1 | 0 | 9999996 | 0 |

FIG. 8

| Audit Name | File Name | Baseline | Records Processed | Overall Matched Rate | Matched Score Rate | Matched Reason Code Rate | Run Date | Run Status |
|---|---|---|---|---|---|---|---|---|
| Audit2 | DemoModelAudit.csv | Work in Progress | 10 | 0 | 0 | 20 | 03/27/2015 03:22:04 PM | Complete |
| Audit1 | DemoModelAudit.csv | Work in Progress | 10 | 0 | 0 | 20 | 03/27/2015 03:18:58 PM | Complete |

```
Model ID:      Model_1
Baseline:      Baseline1
Organization:  Test_org
Audit Name:    Audit3
File Name:     DemoModelAudit.csv
Record Number: 17

[3010] := null
[3022] := null
[3100] := 0 (INTEGER)

[MiningSchema]
[Mining Field]: Input field [3010] has no value. Returning missing value
replacement [null].
[3010] := null
[Mining Field]: Input field [3022] has no value. Returning missing value
replacement [null].
[3022] := null
[3100] := 0 (INTEGER)

[ModelEnsemble]
The predicate of segment model [1] evaluates [False]
All [OutputField] elements associated with this segment and any encapsulating
segments will be considered [null]

The predicate of segment model [2] evaluates [False]
All [OutputField] elements associated with this segment and any encapsulating
segments will be considered [null]

[Output]
[WinningSegmentId] :=null
The [predictedValue] is [null]
[predicted score] := null
[S1 Reason Code 1] := null
[S1 Reason Code 2] := null
[S1 Reason Code 3] := null
[S1 Reason Code 4] := null
[S2 Reason Code 1] := null
[S2 Reason Code 2] := null
[S2 Reason Code 3] := null
[S2 Reason Code 4] := null
[model score] := null
[Reason Code 1] := null
[Reason Code 2] := null
[Reason Code 3] := null
[Reason Code 4] := null
[uncapped final score] := null
[final score] := null
```

MODEL INTEGRATION TOOL

CROSS-REFERENCE TO RELATED APPLICATIONS

This is a U.S. national phase under 35 U.S.C. 371 of International Patent Application No. PCT/US2016/045822, entitled "Model Integration Tool", filed Aug. 5, 2016, which claims priority to U.S. Provisional Application No. 62/201,258, entitled "MODEL INTEGRATION TOOL," filed Aug. 5, 2015, the entirety of which is hereby incorporated by reference herein.

TECHNICAL FIELD

This disclosure generally relates to software executed on a computer or digital data-processing system for creating and managing computer program code, and more particularly relates to a model integration tool for building and debugging predictive or analytical models that are used to generate source code for execution on data-processing platforms.

BACKGROUND

Software development tools can be used for generating, testing, and deploying program code that implements the functionality of analytical or predictive models. For example, an analytical model can be used for identifying relationships between sets of predictor variables (e.g., datasets representing actions performed by entities or transactions between entities) and one or more output variables (e.g., the probability of an entity performing some task or meeting some criteria).

A software development tool can be used to develop a model using data extracted from a data archive or other data source. Data mining and statistical methods can be used to develop model specifications. The software development tool can generate program code that is executed by data-processing platforms models in production environments. A production environment can include one or more computing systems for testing and implementing various operations that are represented by a model (e.g., risk prediction). When the program code is executed in the production environment, the efficacy of a model can be evaluated, and the program code for implementing the model can be updated based on the evaluation.

Relying on the evaluation of the deployed programming code can present disadvantages. For example, the deployment and execution of program code for implementing a model can utilize computing resources (e.g., network bandwidth, processing cycles, memory, etc.) that may be otherwise deployed in a data-processing environment. If an executing of program code for implementing a model results in errors, a debugging process must distinguish errors specific to the software platform (e.g., coding errors for C++, Java, etc.) from errors in the modeling logic (e.g., improper training or calibration of the model). Thus, in some cases, relying on platform-specific evaluations of an analytical model may inefficiently utilize available computing resources.

SUMMARY

Aspects and examples are disclosed for building and auditing predictive or analytical models that are used to generate source code for execution on data-processing platforms. In one example, a processor receives an electronic data-processing model, which generates an analytical output by applying a function to one or more input attributes that are weighted with respective modeling coefficients. The processor identifies a target data-processing platform that requires bin ranges associated with the modeling coefficients and reason codes associated with the input attributes. Each bin range identifies a range of input attribute values for which a modeling coefficient is valid. Each reason code identifies a reason code output indicating an impact of a weighted input attribute on the analytical output. The processor provides a user interface for specifying bin range information and reason code information. The processor identifies the bin ranges and the reason codes based on user input received via the user interface. The processor generates Predictive Model Markup Language ("PMML") code or other suitable modeling code that implements the electronic data-processing model with the bin ranges and the reason codes. The processor outputs source code, which is generated from the PMML code and implements the electronic data-processing model, in a programming language used by the target data-processing platform.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings.

FIG. 3 depicts an example of an interface for mapping model attributes to production attributes of a data processing platform using the system depicted in FIG. 1, according to some aspects of the present disclosure.

FIG. 4 depicts an example of another interface for mapping model attributes to production attributes of a data processing platform using the system depicted in FIG. 1, according to some aspects of the present disclosure.

FIG. 5 depicts an example of an interface for adding bin range information and reason code information to a model using the system depicted in FIG. 1, according to some aspects of the present disclosure.

FIG. 8 depicts an example of an audit file used for testing a model prior to source code generation using the system depicted in FIG. 1, according to some aspects of the present disclosure.

FIG. 9 depicts an example of an interface showing the results of an audit used for testing a model prior to source code generation using the system depicted in FIG. 1, according to some aspects of the present disclosure.

FIG. 10 depicts an example of an executing trace of an audit used for testing a model prior to source code generation using the system depicted in FIG. 1, according to some aspects of the present disclosure.

DETAILED DESCRIPTION

Figure 1:
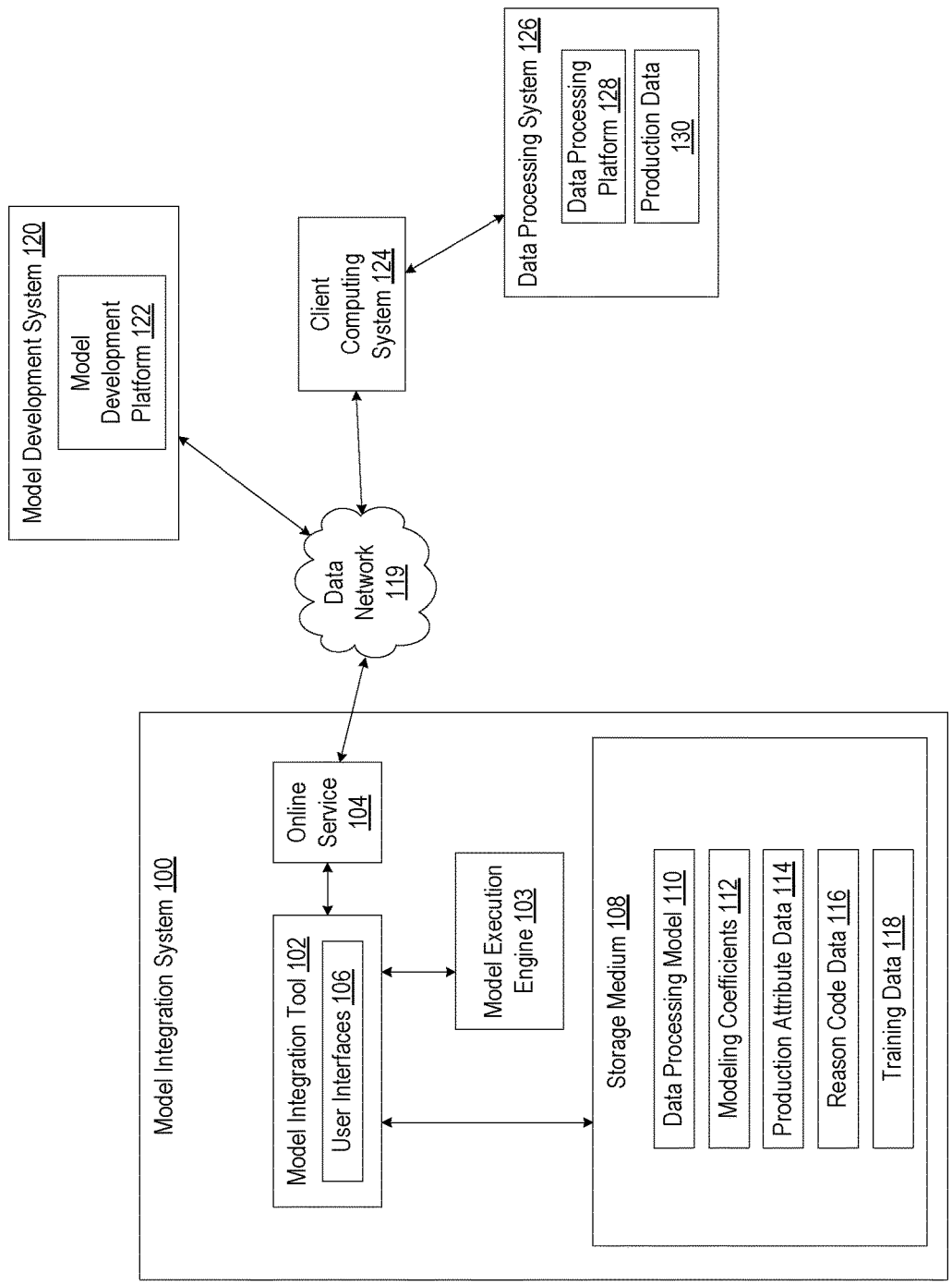
FIG. 1 depicts an example of a system in which a model integration tool can be used for building and testing predictive or analytical models prior to generating source code for implementing the models on data-processing platforms, according to some aspects of the present disclosure.

This disclosure describes a model integration tool. The model integration tool can be executed by a suitable computing system to facilitate model the building and debugging predictive or analytical models that implemented via source code deployed to data-processing platforms. The model integration tool can be used to perform one or more of building an analytical or predictive model, training the model, and testing the model. These operations can be performed using a model in an industry-standard modeling language or other suitable modeling language, prior to generating source code (e.g., C++, Java, etc.) that implements the model. An example of an industry-standard modeling language is the Predictive Model Markup Language ("PMML") format. Building and testing the model in PMML or another modeling language can allow a model to be developed and tested without extensively debugging and revising the source code that is used to implement the modeling logic on data-processing platforms.

The model integration tool can facilitate customizing a model for a specific data-processing platform. For example, the model integration tool can provide features such as mapping production attributes to model attributes for a model, adding bin range and reason code data to the model, and testing the model using the mapping and the added bin range and reason code information. A model that is created using the model integration tool can be tested using a model execution engine without generating source code specific to certain data-processing platforms (e.g., C++ platforms, Java platforms, etc.).

This testing process, which uses PMML or other modeling code, allows errors in the modeling logic to be identified and corrected. In some aspects, these errors can be identified and corrected prior to generating source code for a target data-processing platform. When the model is deployed to a data-processing platform, computing resources are used more efficiently when evaluating the efficacy of the deployed model. For example, errors in the deployed model may be limited to platform-specific issues (e.g., issues specific to C++, Java, etc.) rather than errors in the modeling logic. Thus, a debugging process can focus on these platform-specific errors. In this manner, a computing system that utilizes the model integration tool (e.g., a combination of computing devices used to generate a model and data-processing platforms to which the model are deployed) can reduce the inefficient use of computing resources, can increase the efficiency of debugging processes related to the deployed model, or both.

The features discussed herein are not limited to any particular hardware architecture or configuration. A computing device can include any suitable arrangement of components that provide a result conditioned on one or more inputs. Suitable computing devices include multipurpose, microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a block diagram illustrating an example of a model integration system 100 that can be used to generate and audit modeling code for implementing electronic data-processing models 110. Examples of a data-processing model 110 include a predictive model, an analytical model, or some other type of model.

The model integration system 100 can include a computing device or group of computing devices configured to execute the model integration tool 102. The model integration system 100 can be communicatively coupled, via a data network 119, to one or more client computing systems 124 that can be accessed by one or more users.

A client computing system 124 can include or can access a data-processing system 126. The data-processing system 126 can include one or more processing devices that implement a data-processing platform 128 using production data 130. A data-processing platform 128 can include one or more software components that use source code in a particular programming language, such as C++ software, Java software, proprietary software, or any other programming language or architecture.

The model integration tool 102, which is executed by the model integration system 100, can perform one or more functions for generating and auditing modeling code. For example, the model integration tool 102 can include program instructions executable by one or more processing devices of the model integration system 100 to perform one or more operations. These operations can include creating, testing, and deploying one or more data-processing models 110. A data-processing models 110 can created and tested in an industry-standard modeling language or other suitable modeling language. One example of a modeling language is a set of functions and attributes specified in Extensible Markup Language ("XML") or another suitable language for encoding functions and inputs to functions. Another example of an industry-standard modeling language is the Predictive Model Markup Language ("PMML") format.

A data-processing model 110, such as an analytical model or predictive model, can be used for identifying relationships between sets of predictor variables and one or more output variables. Examples of predictor variables include attributes of an individual or other entity that can be obtained from credit files, financial records, or other data about the activities or characteristics of the entity. Attributes can include, for example, a credit data-related element, a single data element from a credit file, or an aggregation, calculation, or derivation of credit data to form a new data element. Examples of an output variable include a probability of an individual or other entity performing some task (e.g., defaulting on a financial obligation, responding to a sales offer, etc.), a probability of an individual or other entity meeting some criteria (e.g., being approved for a loan), etc.

The model integration tool 102 can facilitate creating and testing data-processing models by generating and providing one or more user interfaces 106. The user interfaces 106 can include interface elements for eliciting data required by a data-processing model 110 for deployment to a particular data-processing platform 128. Examples of these interfaces are described in detail herein.

The model integration tool 102 can have one or more features for using the data-processing model 110. Examples of these features include model creation, model maintenance, model auditing, model deployment, model execution, model importing, model downloading, and model specification generating. Model creation can involve creating logistics models, linear regression models, or other suitable analytical or predictive models. Functions for creating a model include one or more of configuring model metadata, setting up reason codes, creation of scorecards with segmentation, creation of scorecards with calibration, etc. Model maintenance can include updating and versioning of models. Model auditing can include testing a model by uploading an audit file containing attribute values as well as expected scores and reason codes, as described in detail herein. Model deployment can involve generating PMML, executable source code, or both, and providing the PMML or source code to a data-processing system 126 (either directly or via a client computing system 124). Model execution can involve providing the model to a model execution engine 103 (e.g., a predictive analytics decision engine such as the Adaptive Decision and Predictive Analytics ("ADAPA") platform). Importing and downloading models can involve importing a model from a model development system 120 or a client computing system 124 and making the updated model available for download by a client computing system 124, a data-processing system 126, or both. Generating a model specification can include generating a human-readable file (e.g., a PDF document) that lists the model specifications for a data-processing model 110 that has been modified and audited by the model integration tool 102.

The model integration system 100 can include, or can otherwise access, a storage medium 108. The storage medium 108 can include one or more non-transitory computer-readable media included in or accessible to the model integration system 100. The storage medium 108 can store one or more of data-processing models 110, modeling coefficients 112, production attribute data 114, reason code data 116, and training data 118.

Modeling coefficients 112 can include regression coefficients or other coefficients that are used to weight various attributes in a data-processing model 110. In some aspects, modeling coefficients 112 can be generated using a model development platform 122 and provided to the model integration tool 102 with a data-processing model 110. In additional or alternative aspects, modeling coefficients 112 can be generated or modified at a client computing system 124 and transmitted to the model integration tool 102 via a data network 119 using one or more of the user interfaces 106.

Production attribute data 114 can include data describing one or more production attributes used by the data-processing platform 128. In some aspects, the model integration tool 102 can communicate with the data-processing platform 128 via the data network 119 to obtain the production attribute data 114. For example, the model integration tool 102 can transmit a request to the data-processing platform 128 for the production attribute data 114 and receive the production attribute data 114 in response. In additional or alternative aspects, production attributed data can be generated, modified, or otherwise obtained using a client computing system 124 and transmitted from the client computing system 124 to the model integration system 100 via a data network 119 using one or more of the user interfaces 106.

The reason code data 116 can include one or more reason codes. Reason codes can include data that identifies an impact of a particular attribute in a data-processing model 110 on an outcome generated by the data-processing model 110. For example, a reason code indicates the rationale for one or more types of information in a credit report (e.g., the aspects of an entity that resulted in a given credit score) that is generated using a data-processing model 110.

The training data 118 can include data used by the model integration tool 102 to train a data-processing model 110 that has been generated, updated, or modified using the model integration tool 102. In one example, training data 118 may include training inputs (e.g., credit files) and training outputs (e.g., credit scores, associated reason codes, etc.). One or more suitable training algorithms can be used to train the data-processing model 110 to identify relationships between the training inputs and the training outputs of the training data 118, as described in detail herein.

In some aspects, the model integration tool 102 can be accessed by one or more client computing systems 124 via an online service 104. In some aspects, the online service 104 can be a separate service that is executed by the model integration system 100 and that is accessible by the model integration tool 102. In other aspects, the online service 104 can be integrated with the model integration tool 102.

In some aspects, the model integration system 100 can communicate, via a data network 119, with a model development system 120 that is separate from the model integration system 100. The model development system 120 can include any computing device or group of computing devices that execute a suitable model development platform 122. The model integration system 100 can receive modeling code for one or more data-processing models from the model development system 120. The model integration tool 102 can consume this modeling code, which is generated and trained using the model development platform 122. Examples of suitable model development platforms 122 include Statistical Analysis System ("SAS"), Statistical Package for the Social Sciences ("SPSS"), R-programming, etc.

For example, a data-processing model 110 can be developed with a model development platform 122 such as SAS or SPSS. The data-processing model 110 can be modified using the model integration tool 102 and exported in a PMML format.

A data-processing model 110 that is created, modified, or otherwise used by the model integration tool 102 can be deployed to a model execution engine 103. The model execution engine 103 can perform some or all of the functions specified by the data-processing model 110. In some aspects, the model execution engine 103 can perform functions specified by the data-processing model 110 without the need to recode the data-processing model 110 for specific operating environments. An example of a specific operating environment is a data-processing system 126.

In some aspects, a user of the client computing system 124 can be authenticated by one or more of the model integration tool 102 and the online service 104. This authentication can verify that a user of the client computing system 124 is permitted to access the functionality of the model integration tool 102. In some aspects, one or more of the model integration tool 102 and the online service 104 can access subscriber accounts that are stored in, for example, a database or other suitable data source. The subscriber accounts can include data regarding respective users that are subscribers to an online service 104.

The model integration system 100 can electronically communicate with one or more client computing systems 124 via one or more data networks 119. For example, the online service 104 can receive requests from one or more users via the data network 119 to establish one or more subscriber accounts. The online service 104 can establish the subscriber accounts by storing authentication information (e.g., user names, passwords, etc.) that can be used to authenticate one or more users. Subsequent to establishing the subscriber accounts, the online service 104 that includes the model integration tool 102 can authenticate one or more users, thereby allowing the users to access the model integration tool 102.

In some aspects, the online service 104 can include or communicate with one or more of a web server module, a web services module, and an enterprise services module. For example, a web server module can be executed by a suitable processing device to provide one or more web pages or other interfaces to the client computing system 124. The web services module can generate this content by executing one or more analytical algorithms using information retrieved from the storage medium 108. The enterprise services module can be executed to retrieve the information from the storage medium 108.

In some aspects, the model integration tool 102 provides functionality for managing the names of the production attributes that can be used in one or more models. Attributes can include factors used as variables in determining the score of an entity. The value of the attribute can be a natural number, a floating point number, a Boolean value, a character, or a series of characters. An attribute may be the result of the execution of another rule or a combination of other attributes. The model integration tool 102 can be used to create attribute catalogs that will be used in creating the model specification. An Attribute Catalog can include a list of attributes created for a specific organization, user, or other entity.

One example of a data-processing model 110 that can be tested and updated with the model integration tool 102 is a scorecard model. A scorecard model is an analytical function that can be used to calculate one or more metrics on one or more subject entities that assists in making a decision with respect to the subject entity. A complex scorecard (also known as "nested" or "segmented" scorecards) can include multiple intricate scorecards within one model that uses segmentation logic to identify the dependency, flow, and order in which the scoring from each of the scorecards will be included in the overall score.

Figure 2:
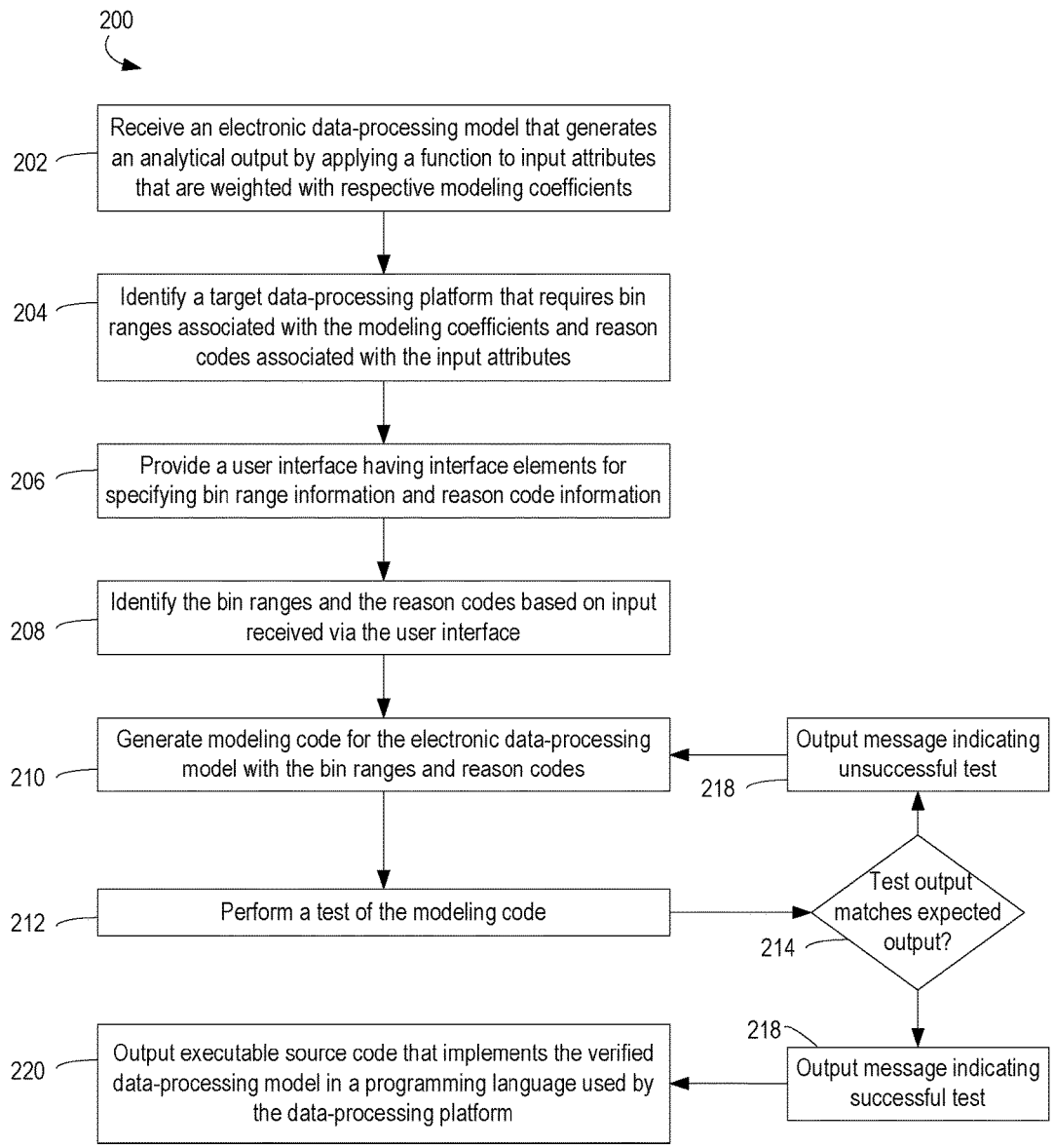
FIG. 2 depicts an example of a method for building and testing predictive or analytical models prior to generating source code for implementing the models on data-processing platforms, according to some aspects of the present disclosure.

In some aspects, the model integration tool 102 can facilitate, execute, or otherwise enable one or more operations for creating a scorecard. For example, FIG. 2 is a flow chart illustrating an example of a process 200 for generating and auditing modeling code for an electronic data-processing model. For illustrative purposes, the process 200 is described with reference to the implementation depicted in FIG. 1 and various other examples described herein. But other implementations are possible.

The process 200 can include receiving an electronic data-processing model that generates an analytical output by applying a function to input attributes that are weighted with respective modeling coefficients, as depicted at block 202. For example, one or more processing devices of model integration system 100 can execute the model integration tool 102 to receive a data-processing model 110. In some aspects, the model integration tool 102 can receive the data-processing model 110 from a client computing system 124. In additional or alternative aspects, the model integration system 100 can receive the data-processing model 110 from a model development system 120.

An input attribute can be an attribute that is identified as one of the inputs to the function included in the data-processing model. For example, an attributes can be a factor used as a variable in determining an analytical output (e.g., credit-related elements used as variables in determining credit scores). The value of the attribute can be a natural number, a floating point number, a Boolean value, a character, or a series of characters. In some aspects, an attribute may be the result of the execution of a rule or a combination of other attributes.

An analytical output can be a number (e.g., a score), a string (e.g., an identification of a reason code), or any other suitable output data that is generated by executing the data-processing model. In some aspects, analytical outputs indicate predictions of behavior by individuals or other entities. For example, an analytical output can have a value (e.g., a credit score) indicating a risk prediction. In additional or alternative aspects, analytical outputs indicate relationships among input attributes. For example, an analytical output can have a value (e.g., a credit score) indicating a degree to which certain input attributes impact other input attributes.

In some aspects, the received data-processing model 110 may lack certain data or functionality that is used with the data-processing model 110 when implemented at a data-processing system 126. In one example, the received data-processing model 110 may lack one or more of bin range information associated with modeling coefficients or reason code information associated with the input attributes. For instance, a model development platform 122, which may be used to generate an initial data-processing model 110, may lack features for specifying bin range information, reason code information, or both. The model integration tool 102 can be used to update the data-processing model 110 to include one or more of bin range information, reason code information, or both, as described herein. Bin range information can include any data that specifies or otherwise indicates a bin range for one or more modeling coefficients. Reason code information can include any data that specifies or otherwise indicates one or more reason codes for a data-processing model 110.

A bin range can include a range of attributes values for which a given modeling coefficient is applicable to an attribute, or a set of ranges of attribute values for which different modeling coefficients are applicable to the attribute. In a simplified example, a data-processing model can include a function $y=B_1X_1+B_2X_2$, where an output y is modeled as a function of attributes $X_1$ and $X_2$ that are weighted by the modeling coefficients $B_1$ and $B_2$. The model may accurately model the behavior of a dataset for certain values of the attributes $X_1$ and $X_2$. The bin ranges for this simplified example are the ranges of values of the attributes $X_1$ and $X_2$ that will result in accurate outputs from a model using the modeling coefficients $B_1$ and $B_2$.

The process 200 can also include identifying a target data-processing platform that requires bin ranges associated with the modeling coefficients and reason codes associated with the input attributes, as depicted at block 204. For example, one or more processing devices of model integration system 100 can execute the model integration tool 102 to identify one or more data-processing platforms 126 to which a received data-processing model 110 will be deployed.

In some aspects, the model integration tool 102 identifies the data-processing system 126 based on user input that is received via one or more of the interfaces 106 and that specifies one or more features of the relevant data-processing platform 128. For example, the model integration tool 102 can store, in the storage medium 108 or another suitable non-transitory computer-readable medium, data identifying one or more data-processing platforms 128 to which a data-processing model 110 may be deployed. The model integration tool 102 can use the stored data to generate an interface that lists one or more of the available data-processing platforms 128. The model integration tool 102 can provide the interface 106 to the client computing system 124. The model integration tool 102 can identify the target data-processing system 126 based on user input that is received from the client computing system 124 via the interface and that specifies one or more features of the relevant data-processing system 126.

The process 200 can also include providing a user interface having interface elements for specifying bin range information and reason code information, as depicted at block 206. For example, one or more processing devices of the model integration system 100 can execute the model integration tool 102 to provide one or more interfaces for specifying bin range information and reason code information. In some aspects, the model integration tool 102 can also provide one or more interfaces for mapping production attributes, as used by a data-processing platform 128, to model attributes included in a data-processing model 110. Examples of interfaces for mapping production attributes to model attributes and for specifying bin range information and reason code information are described herein with respect to FIGS. 3-5.

The model integration tool 102 can provide access to the user interface by a client computing system 124. In some aspects, providing access to the user interface involves transmitting data for the user interface from the model integration system 100 to the client computing system 124. For example, the model integration tool 102 can configure the online service 104 to provide the user interface in a web page. The online service 104 can receive inputs from the client computing system 124 via the user interface. In additional or alternative aspects, providing access to the user interface involves transmitting data for the user interface from the model integration system 100 to a web server or other third-party system that is accessible by the client. For example, the model integration system 100 can transmit one or more instructions to a web server that cause the web server to present the user interface to the client computing system 124. The web server can receive inputs from the client computing system 124 via the user interface and transmit data indicating the user inputs to the model integration system 100.

The process 200 can also include identifying the bin ranges and the reason codes based on input received via the user interface, as depicted at block 208. For example, the model integration tool 102 can receive input from a client computing system 124 that was elicited via one or more of the interfaces provided at block 206. The model integration tool 102 can identify, from this received input, the bin ranges and reason code information to be used in a data-processing model 110 that is to be deployed to a given data-processing platform 128.

The process 200 can also include generating modeling code for the electronic data-processing model with the bin ranges and reason codes, as depicted at block 210. For example, one or more processing devices of the model integration system 100 can execute the model integration tool 102 to generate modeling code, such as PMML code. The modeling code can specify various aspects of a model, such as field names, function names, etc. The PMML or other suitable modeling code can be executed by a model execution engine 103, such as the ADAPA platform, without creating platform-specific source code (e.g., C++, Java, etc.) for implementing the model.

The process 200 can also include performing a test of the modeling code, as depicted at block 212. For example, one or more processing devices of the model integration system 100 can execute the model execution engine 103 in response to one or more commands received via the model integration tool 102. Examples of the testing process are described herein with respect to FIGS. 8-10.

Performing the test can involve, for example, providing an interface for uploading an audit file to a non-transitory computer-readable medium that is accessible by the model integration tool 102. An audit file can include one or more expected analytical outputs, one or more expected reason codes, or some combination thereof. The audit file can also include test values for attributes used by the data-processing model 110 to be tested.

The model execution engine 103 can execute the PMML or other modeling code generated at block 210, using data from the audit file as input data, and thereby generate various test outputs. The test outputs can include test analytical outputs, such as, for example, scores generated by a scorecard data-processing model 110. The model integration tool 102 can compare the test analytical outputs to corresponding expected analytical outputs from the audit file. The test outputs can also include test reason codes. The model integration tool 102 can compare the test reason codes to corresponding expected reason codes from the audit file.

The process 200 can also include determining whether test outputs (e.g., one or more test analytical outputs, one or more test reason codes) match expected outputs (e.g., one or more expected analytical outputs, one or more expected reason codes), as depicted at block 214. If test analytical outputs match the expected outputs, the model integration tool 102 can output one or more messages indicating that the data-processing model 110 has been successfully tested or audited, as depicted at block 216. In some aspects, a match can be an exact match (e.g., a test score exactly matching an expected score). In additional or alternative aspects, a test value can be considered a match to an expected value if the test value falls within a threshold range of expected values (e.g., within a certain range of an expected value identified in an audit file).

If the test analytical outputs match the expected outputs, the model integration tool 102 can output one or more messages indicating that the data-processing model 110 has failed the test or audit, as depicted at block 218. In one example, a test analytical output (e.g., a test score) may be sufficiently different from an expected analytical output that the data-processing model 110 does not provide the desired modeling results. In another example, a test reason code may be different from an expected reason code.

If the data-processing model 110 has failed the test or audit, the process can return to block 210. The model integration tool 102 can be used to update one or more characteristics of the data-processing model 110 (e.g., bin range information, coefficient information, processing logic, etc.). The model integration tool 102 can generate updated PMML code or other modeling code that includes the updates to the data-processing model 110 that were performed subsequent to the unsuccessful test or audit.

The model integration tool 102 can return to block 212 to perform additional tests or audits of the updated PMML code or other modeling code. If the additional tests or audits are successful, the process 200 can include outputting executable source code that implements the verified data-processing model in a programming language used by the data-processing platform, as depicted at block 220. For example, one or more processing devices of the model integration system 100 can generate executable source code (e.g., C++, Java, etc.) that is used by the data-processing platform 128 identified at block 204. The source code generated at block 220 can implement the data-processing model 110 with the bin range information and reason code information described at block 206, 208. The model integration tool 102 can execute a code generation process in which the successfully audited data-processing model 110 is parsed, corresponding source code components are identified, and one or more source code files are generated that implement the data-processing model 110. An example of the code generation process is described herein with respect to FIG. 11.

The model development described in FIG. 2 is provided for illustrative purposes. Other implementations, however, are possible. In some aspects, one or more of the blocks depicted in FIG. 2 may be omitted. For example, the model integration tool 102 may generate and output executable source code after generating the PMML or other modeling code, without performing a test of the PMML code or other modeling code.

As discussed with respect to FIG. 2, the model integration tool 102 can be used for mapping the model attributes from a data-processing model 110 to production attributes in the production data 130. For example, a model attribute can include the attribute name that is used in PMML code or other modeling code that is outputted from a model development platform 122. The name of the model attribute may differ from a name of a corresponding attribute in production data 130 that is used by a data-processing platform 128 for which the data-processing model 110 is being developed. The model integration tool 102 can be used to create a mapping between the model attribute and the production attribute, thereby allowing the production data 130 or corresponding training data 118 to be used with the data-processing model 110 under development.

For example, the model integration tool 102 can generate and provide an interface that includes one or more interface elements for creating a mapping between an attribute from a trained model and an attribute from a production environment that includes the data-processing platform 128 and the production data 130. For example, the model integration tool 102 can communicate with the client computing system 124, the data-processing system 128, or another suitable computing device to identify one or more attributes from the production data 130. The model integration tool 102 can generate an interface that displays one or more of the identified attributes from the production data 130. When generating the interface, the model integration tool 102 can also include one or more interface elements that display one or more of the attributes from the training model. For example, the model integration tool 102 can access an imported file with the attributes from the training model, retrieve the attributes from the imported file, and include the retrieved attributes in the interface.

The model integration tool 102 can receive input from a user identifying a mapping between an attribute from the training model and a corresponding attribute from the production data 130. For example, the input can include a selection of an attribute from the training model as displayed in the interface, and a selection of an attribute from the production data 130 as displayed in the interface, and a selection of a command to create a mapping. In response to receiving the input, the model integration tool 102 can create a mapping between an attribute from the training model and a corresponding attribute from the production data 130. For example, the model integration tool 102 can create an entry in a table or other data structure stored in the storage medium 108 (or another suitable non-transitory computer-readable medium) that identifies the association between the attribute from the training model and the corresponding attribute from the production data 130.

In the example depicted in FIG. 3, the user can access different production attributes from the production attribute data 114 via the interface 300. For instance, the menu element 302 can allow the user to indicate a production attribute from a drop-down menu. The interface 300 can also depict the names of model attributes from the data-processing model 110, one of which can be selected via the radio buttons 304. To complete the mapping of model attributes to production attributes, the user can click the appropriate one of the radio buttons 304. In response to receiving user input indicating a selection of a production attribute and a modeling attribute via the interface 300, the model integration tool 102 can create a mapping between the production attribute and the modeling attribute in the storage medium 108.

FIG. 4 depicts an example of another interface 400 for mapping production attributes to model attributes. In the example depicted in FIG. 4, the user can access different production attributes from the production attribute data 114 via the interface 400. For instance, the menu elements 402 can allow the user to indicate different production attributes from drop-down menus. The interface 400 can also depict the names of model attributes from the data-processing model 110 (e.g., the model attributes listed under the "SAS Name" column). To complete the mapping of model attributes to production attributes, the user can select production attributes to be mapped to the displayed model attributes. In response to receiving user input indicating a selection of various production attributes via the interface 400, the model integration tool 102 can create a mapping between the production attribute and the modeling attribute in the storage medium 108.

Another operation for creating a scorecard involves obtaining regression coefficients for a model. The model integration tool 102 can be used to identify, input, or otherwise provide regression coefficients from a training model. The model integration tool 102 can provide an interface that includes one or more interface elements for identifying regression coefficients. For example, the interface 400 can also include fields 404 that allow the user to enter regression coefficients or other modeling coefficients to be applied to the attributes used in a data-processing model 110. (Other implementations can use other interface elements for entering regression coefficients.)

In some aspects, an interface presented by the model integration tool 102 can include one or more interface elements, such as fields, for identifying the location of a file in which the regression coefficients are stored. The interface can also include a command element that allows a user to send an "import" command to the model integration tool 102. The model integration tool 102 can receive input from a user identifying the regression coefficients. For example, the model integration tool 102 can receive data that is entered into the field element and that identifies the location of the file in which modeling coefficients 112 (e.g., regression coefficients) are stored. The interface can also receive an import command that is triggered by the command element being clicked or otherwise selected in the interface.

In response to receiving the input, the model integration tool 102 can import the file that includes the modeling coefficients 112. In some aspects, the model integration tool 102 can retrieve modeling coefficients 112 from a file system that is stored on the storage medium 108. In additional or alternative aspects, the model integration tool 102 can send a request for the file to the data source at which the modeling coefficients 112 are stored, and can receive a responsive transmission from the data source that includes the modeling coefficients 112.

In one example, the user can add a scorecard for a model by importing a regression table, which can include a set of regression coefficients, or other modeling coefficients 112. The regression table can be a delimited file that generated using, for example, a model development platform 122 that has been used to develop, at least partially, a scorecard model. A user can choose and upload the delimited file with regression coefficients. The imported coefficients can be used to populate the values under the "Points" column depicted in the interface 400 of FIG. 4.

As discussed above with respect to FIG. 2, the model integration tool 102 can be used to add bin range information to a data-processing model 110. In some aspects, bin ranges are a one-to-many relationship with respect to the attributes utilized in the scorecard or other data-processing model 110.

The model integration tool 102 can provide an interface that includes one or more interface elements for obtaining bin ranges. For example, FIG. 5 depicts an example of an interface 500 that can be used by the model integration tool 102 to obtain bin range information. The interface 500 can include a table 501 that is used to identify bin ranges for different regression coefficients. The model integration tool 102 can receive input from a user identifying bin ranges. For example, a user can modify the table 501 to specify bin ranges for different regression coefficients. In response to receiving the input, the model integration tool 102 can store the bin ranges in a data file that is associated with a given data-processing model 110.

In the example depicted in FIG. 5, the interface 500 displays mapped attributes and the corresponding points for a scorecard. Examples of the fields that can be included in this interface are fields 504 (labeled "Attribute ID and Description"), 406 (labeled "Bin Range"), 408 (labeled "Points"), 410 (labeled "Bin Type (Original)"), 412 (labeled "Transformation"), 414 (labeled "Reason Code"), and 416 (labeled "Return 5th RC?").

The field 504 can display production attributes from the production attribute data 114 that have been mapped to model attributes from a data-processing model 110 (e.g., an uploaded scorecard model file). In the example depicted in FIG. 5, field 504 displays an attribute identifier for a production attribute. In some aspects, multiple model attributes from the data-processing model 110 can be mapped to the same attribute identifier for a production attribute.

The field 506 can allow a user to input a bin range. The bin range can be a range of attribute values for which a corresponding modeling coefficient (e.g., a regression coefficient from an uploaded scorecard model) is applicable. An attribute can have multiple bin ranges associated with it. In the example depicted in FIG. 5, each bin range is displayed in a separate row under the attribute. The field 508 can be used to display or input a regression coefficient associated with a particular bin range for a particular attribute.

The field 510 can allow a user to specify whether the attribute values for a given modeling coefficient can be used as-is or whether the attribute values must be transformed in some way (e.g., through an equation to normalize the attribute values). For example, if the "original" attribute values can be used, a user can select "Yes" for the bin type. If the "original" attribute values must be transformed for use in the model, a user can select "No" for the bin type.

If a bin must undergo transformation, the transformation expression can be entered in to the field 512. For example, a user can enter a mathematical expression using, as inputs, the attribute value and the modeling coefficient (e.g., "points") for the corresponding bin range.

The field 514 can allow a user to select a reason code for the model. For example, the field 514 can be a drop-down menu with available reason codes for the model. A reason code can be selected that corresponds to the value in the bin range.

As discussed above with respect to FIG. 2, the model integration tool 102 can be used to add reason code information to a data-processing model 110. Reason codes can, for example, indicate the rationale for one or more types of information in a credit report (e.g., the aspects of an entity that resulted in a given credit score). The model integration tool 102 can provide an interface that includes one or more interface elements for identifying reason codes. For example, a user interface provided by the model integration tool 102 can include a field element for identifying the location of a file in which the reason codes are stored. The interface can also include a command element that allows a user to send an "import" command to the model integration tool 102.

The model integration tool 102 can receive input from a user identifying the reason codes. For example, the model integration tool 102 can receive data that is entered into the field element and that identifies the location of the file in which the reason codes are stored. The interface can also receive an import command that is triggered by the command element being clicked or otherwise selected in the interface. In response to receiving the input, the model integration tool 102 can import the file that includes the reason codes. In one example, the model integration tool 102 can retrieve the file from a file system that is stored on the storage medium 108 or another non-transitory computer-readable medium accessible to the model integration system 100. In another example, the model integration tool 102 can send a request for the file to the data source at which the file is stored and can receive a responsive transmission from the data source that includes the file.

In some aspects, a data-processing model 110 that includes scorecard functionality can include multiple scorecard functions. Each of the scorecard functions can be referred to as "Segments" in PMML model that is generated from the data-processing model 110. For example, when a scorecard model is executed, only one scorecard (segment) may be used in calculating the model score. This segment is called the "winning segment." The model integration tool 102 can present an interface to a user for defining segmentation logic, which is used to determine which segment is to be selected as the winning segment when a data-processing platform 128 executes the data-processing model 110. The segmentation logic can include an expression that defines the conditions on which a given segment (e.g., a particular scorecard function) will be selected, at runtime, to generate an analytical or predictive output (e.g., by calculating a score using the model). If a data-processing model 110 has more than one scorecard, then each scorecard can be addressed via the segmentation logic.

Segmentation logic can be defined using one or more suitable interfaces. For example, the model integration tool 102 can present an interface for selecting, entering, or otherwise inputting a segmentation expression. The segmentation expression can include mathematical conditions applied to one or more attributes that are used in a data-processing model 110. In some aspects, the segmentation expression for a data-processing model 110 can also refer to attributes that are not included in the data-processing model 110. For example, the segmentation logic can refer to an attribute in the production attribute data 114 or any other suitable attribute that is defined in an attribute catalog associated with a data-processing model 110 that is under development.

In additional or alternative aspects, the model integration tool 102 can facilitate, execute, or otherwise enable one or more operations for developing a data-processing model 110 that incorporates multiple decision trees or other analytical functions. In one example, a data-processing model 110 may use a prediction of card usage to develop a spending estimate for one or more entities. The data-processing model 110 can use different decision trees to develop different predictions of card usage. For instance, a first decision tree may be developed using a "thick" credit file (e.g., a credit file having a number of tradelines that exceeds a threshold number). A second decision tree may be developed using a "thin" credit file (e.g., a credit file having a number of tradelines that is less than the threshold number). Modeling logic in a data-processing model 110 can obtain a prediction of card usage from one of the decision trees and use the prediction to develop a spending estimate. During execution of the data-processing model 110, a particular decision tree can be selected based on whether a credit file to be used is a thin file or a thick file.

One operation for developing a model that uses multiple decision trees involves obtaining a decision tree or multiple decision trees that are to be added to or otherwise included in a model. The model integration tool 102 can be used to identify, input, or otherwise provide decision trees that are developed using a training model. The model integration tool 102 can provide an interface that includes one or more interface elements for identifying decision trees. For example, the interface can include a field element for identifying the location of a PMML file or other modeling code in which one or more decision trees are stored. The interface can also include a command element that allows a user to send an "import" command to the model integration tool 102.

In some aspects, the model integration tool 102 can receive user input identifying the decision trees. For example, the model integration tool 102 can receive data that is entered into an appropriate user interface and that identifies the location of the file in which the decision trees are stored. The interface can also receive an import command that is triggered by the command element being clicked or otherwise selected in the interface. In response to receiving the user input obtained via the interface, the model integration tool 102 can import the file that includes the decision trees. For example, the model integration tool 102 can send a request for the file to the data source at which the file is stored and can receive a responsive transmission from the data source that includes the file.

Figure 6:
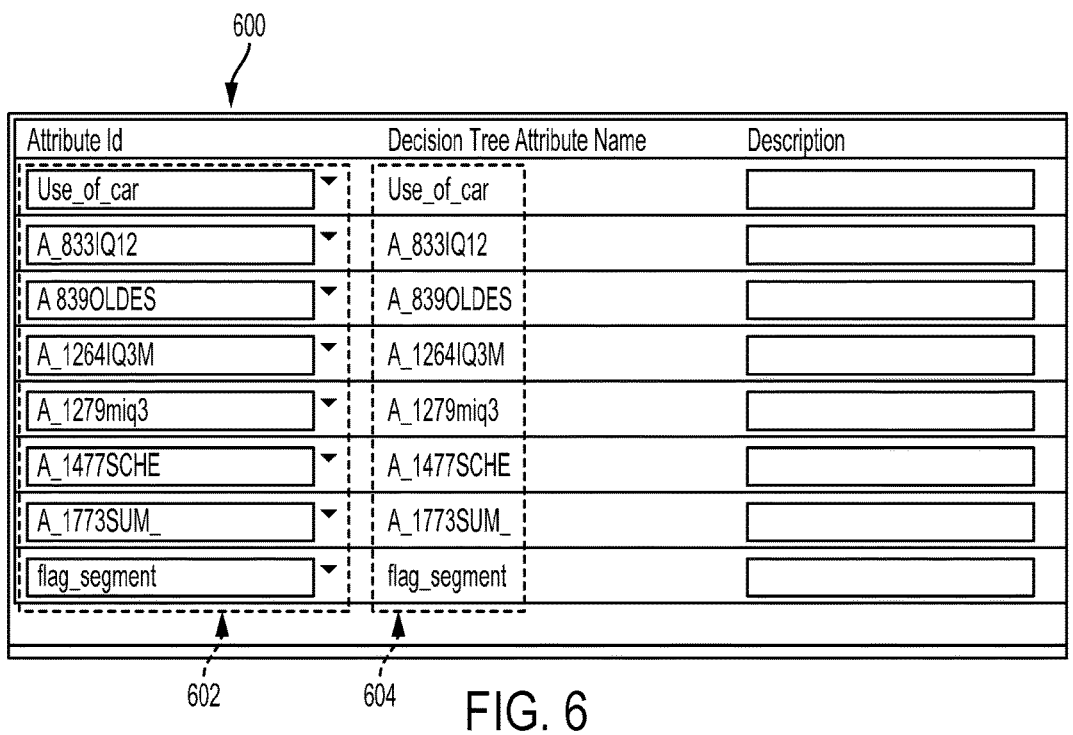
FIG. 6 depicts an example of an interface for mapping model attributes involving decision trees to production attributes of a data processing platform using the system depicted in FIG. 1, according to some aspects of the present disclosure.

Another operation for developing a model that uses multiple decision trees involves mapping attributes used in one or more decision trees to attributes in a production environment, such as the data-processing system 126. The model integration tool 102 can provide an interface, such as the interface 600 depicted in FIG. 6, that includes one or more interface elements for creating a mapping between an attribute from a model and an attribute from a production environment. The model integration tool 102 can access the production attribute data 114 to identify one or more attributes from the production environment. The model integration tool 102 can generate the interface 600, which includes one or more interface elements 502 for displaying or selecting one or more of the identified attributes from the production attribute data 114. The model integration tool 102 can also include one or more interface elements 604 that display one or more of the attributes used in the decision tree. For example, the model integration tool 102 can access an imported file with the attributes used in the decision tree, retrieve the attributes from the imported file, and include the retrieved attributes in the interface.

The model integration tool 102 can receive input from a user identifying a mapping between an attribute used in the decision tree and a corresponding attribute from the production environment. For example, the input can include a selection of an attribute used in the decision tree and a selection, via one or more of the interface elements 602, of a production attribute from the production environment. The input can also include a selection of a command to create a mapping. In response to receiving the input, the model integration tool 102 can create a mapping between an attribute used in the decision tree and a corresponding attribute from the production environment. For example, the model integration tool 102 can create an entry in a table or other data structure stored in a non-transitory computer-readable medium that identifies the association between the attribute used in the decision tree and the corresponding attribute from the production environment.

Figure 7:
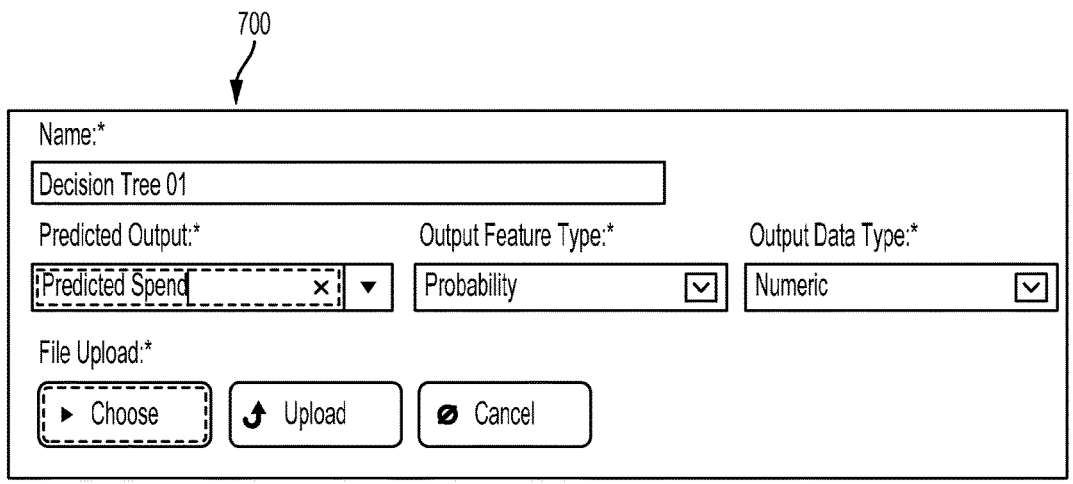
FIG. 7 depicts an example of an interface for configuring a model that involves decision trees, according to some aspects of the present disclosure.

The interface 700 depicted in FIG. 7 can be used to import a decision tree file or otherwise configure a data-processing model 110 for using a decision tree function. The "Predicted Output" field can allow a user to select the name of the output that the decision tree is expected to return. The "Output Feature Type" field can allow a user to select the type of output that the decision tree is expected to return (e.g., "Probability" and "Predicted"). The "Output Data Type" field can allow a user to select whether the decision tree output is Numeric or String type. If "Probability" is selected as the "Output Feature Type," the "Output Data Type" may be limited to "Numeric." If "Predicted" is selected as the "Output Feature Type," the "Output Data Type" may be "Numeric" or "String."

Another operation for developing a model that uses multiple decision trees involves providing segmentation logic for selecting a given decision tree. The model integration tool 102 can provide an interface that includes one or more interface elements for these criteria. A segmentation expression entered into this interface can include mathematical conditions applied to one or more attributes that are used in the model. For example, a user can input data indicating that a number of trade lines above a threshold should trigger the use of a first decision tree and that a number of trade lines below a threshold should trigger the use of a second decision tree. In response to receiving the input, the model integration tool 102 can store the criteria in a data file that is associated with the model to be developed. Similarly to the selection of different modeling segments, as described above, the segmentation expression for a decision tree can also contain attributes that are not included in the decision tree.

In additional or alternative aspects, the model integration tool 102 can provide one or more suitable interfaces that elicit input identifying how output from the decision tree is outputted. For example, if a data-processing model 110 has multiple decision trees, the final output can be a combination of the output of those trees or it can be the output of the last decision tree executed.

The model integration tool 102 can use the data obtained via the various interfaces described herein to generate and build modeling code for implementing the functionality of a data-processing model 110. In some aspects, the model integration tool 102 can use the data obtained via the various interfaces described above to build a specification for a model that uses multiple scorecards, multiple decision trees, or some combination thereof. The model integration tool 102 can generate modeling code, such as PMML code, for implementing one or more functions of a data-processing model 110. For instance, the model integration tool 102 can generate PMML code or other suitable modeling code for implementing the data-processing model 110 with multiple scorecards, multiple decision trees, or both. The PMML code or other suitable modeling code can be generated based on the specification. In some aspects, generating the PMML code or other modeling code can involve updating PMML code or other modeling code that has been received from a model development system 120 or a client computing system 124. In additional or alternative aspects, generating the PMML code or other modeling code can involve generating a new set of PMML code or other modeling code to implement a model that has been developed using the model integration system 100.

In some aspects, the PMML code or other modeling code can also be used to train the model with the aspects identified in a model specification that is generated via the model integration tool 102. For example, the model integration tool 102 can access training data 118 from the storage medium 108 or other non-transitory computer-readable medium. The training data 118 can include training inputs (e.g., credit files) and training outputs (e.g., credit scores, associated reason codes, etc.). In some aspects, machine-learning algorithms (e.g., decision trees, neural nets, random forest, etc.) can be generated using model development platforms 122, such as SPSS and SAS eMiner. These machine-learning algorithms can be used to train or otherwise modify a data-processing model 110 that is managed using the model integration tool 102.

Training the model can include modifying PMML code or other modeling code such that a data-processing model 110 provides desired analytical or predictive outputs based on certain attribute values. For example, a data-processing model 110 can be trained to assign reason codes to certain attributes based on the modeling coefficients 112, the reason code data 116, and the bin ranges that have been obtained using the interfaces described herein.

As described herein with respect to FIG. 2, the model integration tool 102 can also provide model-auditing features. For instance, the PMML code or other modeling code that implements a data-processing model 110 can be used to audit the data-processing model 110. In one example, a data file (e.g., a delimited file such as a comma-separated values ("CSV") file) can be imported into the model integration tool 102. The delimited data file can include sample input data for auditing the model and sample expected outputs. Examples of sample input data include a set of attribute values calculated from credit data, financial data, or other data indicating various characteristics or activities of one or more entities. Examples of sample expected outputs include credit scores, risk scores, reason codes, etc.

The model integration tool 102 can use the model execution engine 103 to test or otherwise execute the data-processing model 110 using the sample input data. The model integration tool 102 can determine whether the sample expected outputs match the outputs that have been obtained by executing the model using the sample input data. The extent to which the sample expected outputs match the obtained outputs can indicate the success of the auditing process.

FIG. 8 depicts an example of a delimited data file 800 that can be used for auditing a data-processing model 110. The field 802 can include unique numeric identifiers for different records in a test data set contained in the delimited data file 800. The field 804 can identify an expected predictive or analytical output (e.g., a score) based on a given set of input attribute values included in the delimited data file 800. The model integration tool 102 can compare an expected predictive or analytical output with a calculated predictive or analytical output generated by the model integration tool 102 performing a test of the data-processing model 110 (e.g., auditing the data-processing model 110).

The fields 806 can identify different expected reason codes that are to be outputted when implementing the data-processing model 110. In this example, five reason codes are returned for a scorecard model, so the delimited data file 800 includes a field for each of the five reason codes. The expected reason codes are compared with the calculated reason codes generated by the model integration tool 102 performing a test of the data-processing model 110 (e.g., auditing the data-processing model 110).

The fields 808 can identify a set of attribute values to be used in a test of the data-processing model 110. In the example depicted in FIG. 8, this set of attribute values can also include attributes that are used by segmentation logic used within a data-processing model 110 (e.g., segmentation logic for selecting a specific decision tree or other analytical function).

The results of an audit can be depicted in a suitable interface. FIG. 9 depicts an example of a results interface 900 generated by a test of a data-processing model 110 by the model integration tool 102. In this example, the results interface 900 identifies a name for the audit, a file name for the audit file (e.g., the delimited data file 800) that was used to perform a test of a data-processing model 110, a model baseline for which the audit was run. The results interface 900 can also identify a number of records that were successfully processed from the audit file, a percentage of records in the audit file for which both the returned score and the returned reason codes matched the expected score and reason codes from the uploaded file, a percentage of records in the file for which the returned score matched the expected score from the uploaded file, and a percentage of records in the file for which the returned reason codes matched the expected reason codes from the uploaded audit file. The results interface 900 can also identify the date of the audit and the execution status (e.g., "Complete" or "Failed") for the audit.

In some aspects, the model integration tool 102 can generate an execution trace for an audited data-processing model 110. The execution trace can include details of the calculated values of attributes, scores, etc. at each stage of the model execution. FIG. 10 depicts an example of an execution trace 1000.

As described herein with respect to FIG. 2, the model integration tool 102 can deploy a data-processing model 110 into a production environment that includes the data-processing system 126. For example, the model integration tool 102 can receive, via an interface, input from a user indicating that the user wishes to deploy the model (e.g., a selection of a "Deploy" command in a menu). The model integration tool 102 can identify any platform-specific aspects of the production environment. For example, the production environment may include one or more computing systems that perform data processing using C++ software, Java software, proprietary software, or any other programming language or architecture that is different from a modeling language that is used to generate and audit the model.

In some aspects, the model integration tool 102 can identify platform-specific aspects based on one or more user inputs received via an interface that specify the platform-specific aspects of the production environment (e.g., receiving input specifying that the audited model should be deployed to a C++ production environment). In additional or alternative aspects, the model integration tool 102 can identify the production environment based on one or more user inputs received via an interface (e.g., selection of "Production Environment 1" from a list of production environments) and can identify the platform-specific aspects based on stored data about the selected environment (e.g., one or more data files indicating that the Production Environment 1 uses C++).

The model integration tool 102 can include a code generator that creates an object to collect model information required for the code generation. The code generator can employ a chain of code generation commands responsible of generating the C++ project. For example, FIG. 11 depicts an example of a process flow for deploying a model to a platform-specific environment.

Figure 11:
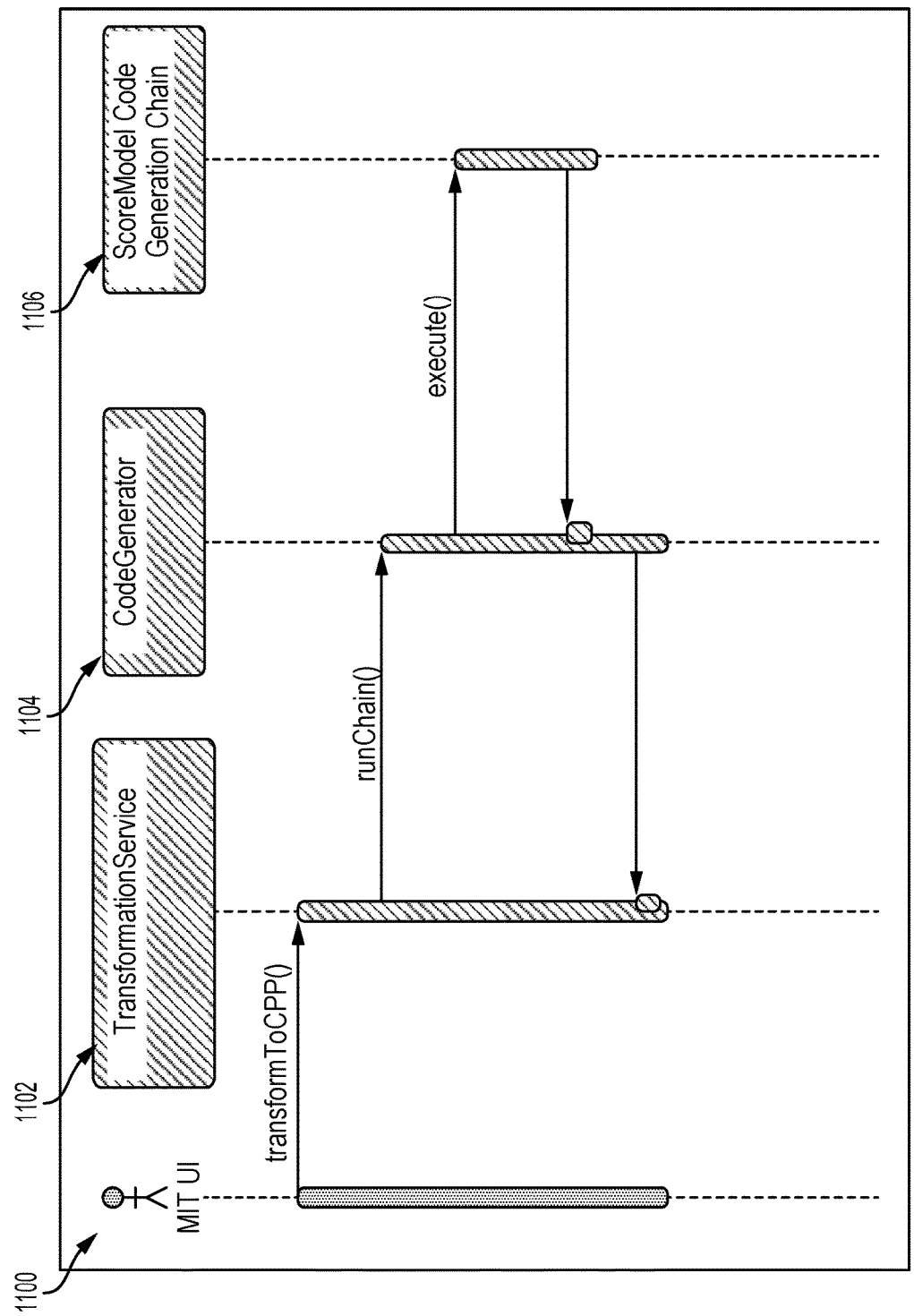
FIG. 11 depicts an example generating source code for a tested model using the system depicted in FIG. 1, according to some aspects of the present disclosure.

In the example depicted in FIG. 11, a controller bean 1102 of the model integration tool 102 can call a transformToCPP( ) method on a transformation service in response to a transform command receive via a user interface 1100 of the model integration tool 102. The method can create a PredictiveModel object containing model data. The method can provide the PredictiveModel object and a code generation chain name to a code generator module that is included in or accessible to the model integration tool 102. The code generator 1104 of the model integration tool 102 can output C++ codes via a ScoreModel Code Generation Chain 1106.

An example of a model outputted for a C++ platform can include the following files:
Make file: makefile
Model entry: SCPD{model id}.cpp
Test stub: Test{mode id}.cpp
Model header: CMDL{model id}.h
Model implementation: CMDL{model id}.cpp
Scorecard implementation (one per scorecard): CMDL{model id}Scorecard {scorecard id}.cpp One example of generating C++ code from a PMML-based model is implementing a reject code function in C++. A reject code can be assigned when a score cannot be derived. Normally, one reject code per scorecard only is assigned. To implement the reject code function, the code generator looks for reject codes contained in logic of a "Reject Code" output field in the PMML file. If the code generator finds a supported reject code, the code generator can generate the corresponding C++ codes in the reject ( ) method in the model implementation class.

Another example of generating C++ code from a PMML-based model is implementing a 5th reason code function in C++. A 5th reason code can be a 'Y' or blank flag that is returned for a model and can indicate whether inquiries affected a score. To implement the 5th reason code function, the code generator looks for the 5th reason code logic from a "Reason Code 5" output field in the PMML file. A method (e.g. "calculate5thReasonCode") can be generated in a model implementation class to calculate the 5th reason code. The method can take the winning segment/scorecard identifier as argument. Depending on the actual 5th reason code logic, some class level attributes may also be calculated and used along with the winning segment/scorecard identifier to determine the inquiry score impact flag value ("Y" or " "), and then set the flag to the score object. At the execution time, the method is called with the score( ) method after a winning scorecard is selected and calculated, but before a finalCalculations( ) method.

Another example of generating C++ code from a PMML-based model is implementing attribute definition and calculations in C++. Each attribute can be coded as a C++ class. Some attributes can have dependencies on others. The code generator can load the attribute dependency information from data files and automatically generate codes to calculate dependent attributes as well as the primary attributes. Attributes used in the segmentation and 5th reason code logic can be calculated at a score model level. Attributes used in the scorecards can be calculated within scorecard implementation codes. For example, the model integration tool 102 can read credit records from a suitable dataset, and supply the parsed credit record information to aggregate all the attributes required for a score model.

Figure 12:
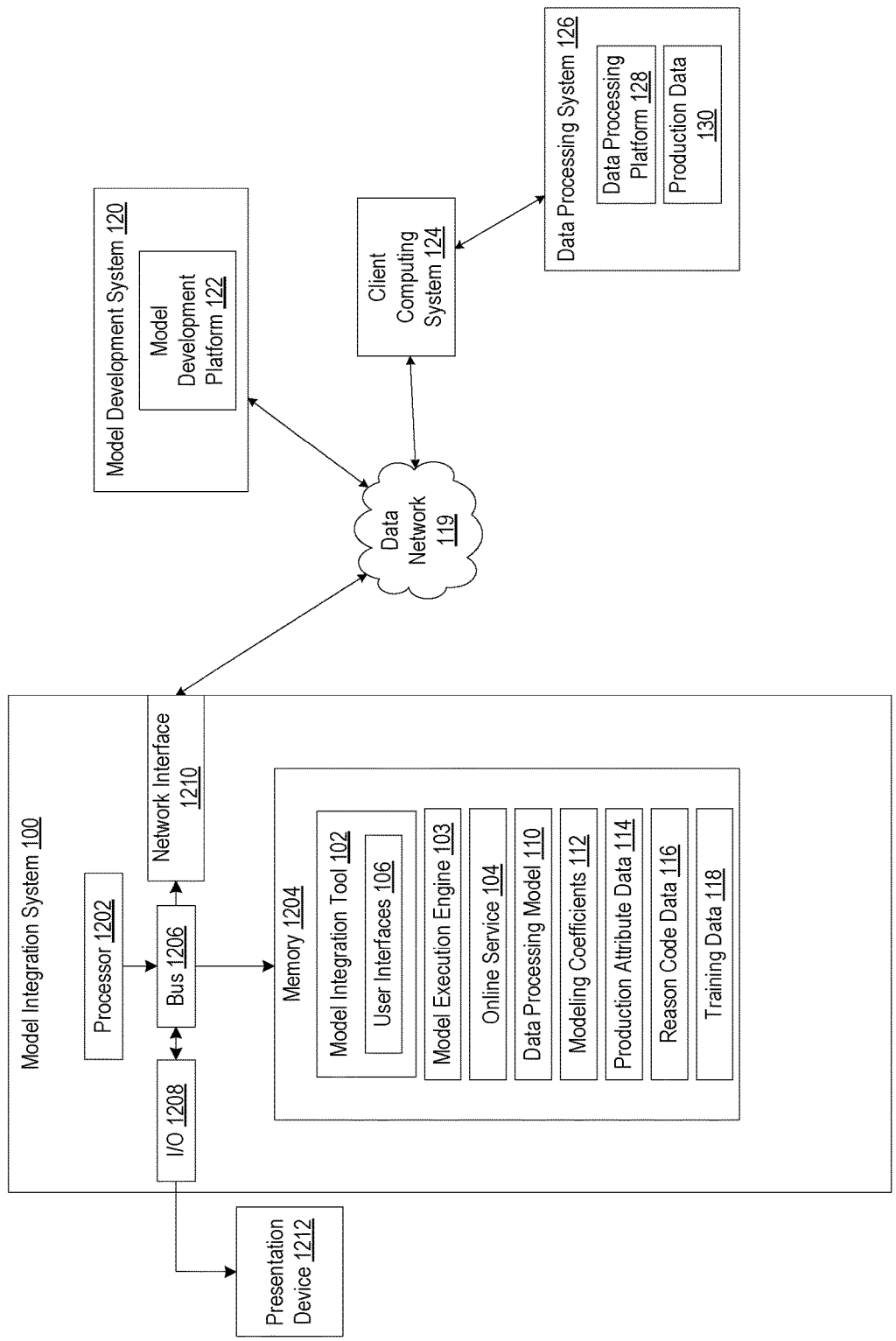
FIG. 12 depicts an example of a computing system for implementing certain features, according to some aspects of the present disclosure.

Any suitable computing system or group of computing systems can be used to perform the operations described herein. For example, FIG. 12 is a block diagram depicting an example of a model integration system 100. The example of the model integration system 100 can include various devices for communicating with one or more of the model development system 120, the client computing system 124, and the data-processing system 126. The example of the model integration system 100 can also include various devices for storing the datasets used for developing and auditing data-processing model 110 (e.g., the modeling coefficients, production attribute data, reason code data, and training code data), as described above with respect to FIG. 1. The example of the model integration system 100 can also include various devices for performing one or more operations described above with respect to FIGS. 1-11.

The model integration system 100 can include a processor 1202 that is communicatively coupled to a memory 1204. The processor 1202 executes computer-executable program code stored in the memory 1204, accesses information stored in the memory 1204, or both. Examples of a processor 1202 include a microprocessor, an application-specific integrated circuit, a field-programmable gate array, or any other suitable processing device. The processor 1202 can include any number of processing devices, including one. The processor 1202 can include or communicate with a memory 1204. The memory 1204 stores program code that, when executed by the processor 1202, causes the processor to perform the operations described in this disclosure.

The memory 1204 can include any suitable non-transitory computer-readable medium (e.g., the storage medium 108 depicted in FIG. 1). The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The model integration system 100 may also include a number of external or internal devices such as input or output devices. For example, the model integration system 100 is shown with an input/output interface 1208 that can receive input from input devices or provide output to output devices. A bus 1206 can also be included in the model integration system 100. The bus 1206 can communicatively couple one or more components of the model integration system 100.

The model integration system 100 can execute program code that includes the model integration tool 102, the model execution engine 103, and the online service 104. Although FIGS. 1 and 12 depict the model integration tool 102, the model execution engine 103, and the online service 104 as separate software modules executed by the same system, other implementations are possible. In some aspects, a model integration tool 102 can be an application that includes software modules that implement one or more of the model execution engine 103 and the online service 104. In other aspects, a model integration tool 102 can be an application that communicates with one or more computing devices over a data network 119 that execute one or more of the model execution engine 103 and the online service 104.

The program code for the model integration tool 102, the model execution engine 103, and the online service 104 may be resident in any suitable computer-readable medium and may be executed on any suitable processing device. For example, as depicted in FIG. 12, the program code for the model integration tool 102, the model execution engine 103, and the online service 104 can reside in the memory 1204 at the model integration system 100. Executing one or more of the model integration tool 102, the model execution engine 103, and the online service 104 can configure the processor 1202 to perform the operations described herein.

In some aspects, the model integration system 100 can include one or more output devices. One example of an output device is the network interface device 1210 depicted in FIG. 12. A network interface device 1210 can include any device or group of devices suitable for establishing a wired or wireless data connection to one or more data networks 119. Non-limiting examples of the network interface device 1210 include an Ethernet network adapter, a modem, etc. Another example of an output device is the presentation device 1212 depicted in FIG. 12. A presentation device 1212 can include any device or group of devices suitable for providing visual, auditory, or other suitable sensory output indicating recommendations generated by the model integration tool 102. Non-limiting examples of the presentation device 1212 include a touchscreen, a monitor, a speaker, a separate mobile computing device, etc.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A model integration system comprising:
 a processor communicatively coupled via a data network to a client computing system; and
 a non-transitory computer-readable medium storing program code that provides a model integration tool and that is executable by the processor;
 wherein the processor is configured for executing the program code to perform operations comprising:

receiving an electronic data-processing model that generates an analytical output by applying a function to one or more input attributes weighted with one or more modeling coefficients, respectively, identifying a target data-processing platform that requires one or more bin ranges associated with the one or more modeling coefficients and one or more reason codes associated with the one or more input attributes, wherein each bin range identifies a range of input attribute values for which a respective modeling coefficient is valid, wherein each reason code identifies a respective reason code output indicating a respective impact of a respective weighted input attribute on the analytical output, providing a user interface having interface elements for specifying bin range information identifying the one or more bin ranges and reason code information identifying the one or more reason codes, the user interface having one or more additional interface elements for uploading, to the non-transitory computer-readable medium or an additional non-transitory computer-readable medium accessible to the model integration tool, an audit file having an expected analytical output and an expected reason code, identifying the one or more bin ranges and the one or more reason codes based on user input received via the user interface and indicating the bin range information and the reason code information, generating Predictive Model Markup Language (PMML) code that implements the electronic data-processing model with the one or more bin ranges and the one or more reason codes, verifying, from a test of the PMML code and prior to outputting executable source code in a programming language used by the target data-processing platform, that a test analytical output matches the expected analytical output and that a test reason code matches the expected reason code, wherein verifying that the test analytical output matches the expected analytical output and the test reason code matches the expected reason code comprises:
(i) accessing the audit file from the non-transitory computer-readable medium or the additional non-transitory computer-readable medium, and
(ii) comparing the expected analytical output and the expected reason code stored in the audit file with the test analytical output and the test reason code, and outputting the executable source code in the programming language used by the target data-processing platform, wherein the executable source code is generated from the PMML code and implements the electronic data-processing model with the one or more bin ranges and the one or more reason codes.

2. The model integration system of claim 1, wherein the user interface further comprises one or more additional interface elements for:
identifying a mapping of the one or more input attributes to one or more production attributes from the target data-processing platform, and
identifying one or more transformations of one or more respective values of the one or more production attributes into one or more respective values that are compliant with the electronic data-processing model,
wherein the PMML code implements the mapping and the one or more transformations.

3. The model integration system of claim 1, the operations further comprising, prior to verifying that the test analytical output matches the expected analytical output and the test reason code matches the expected reason code:
performing an additional test of the PMML code;
determining that the additional test results in a failed test, the failed test comprising an additional test analytical output that fails to match the expected analytical output or an additional test reason code that fails to match the expected reason code; and
updating the PMML code subsequent to the failed test, wherein the PMML code, as updated, results in the test analytical output and the test reason code matching the expected analytical output and the expected reason code.

4. The model integration system of claim 1, wherein the electronic data-processing model comprises a regression model and wherein the one or more modeling coefficients comprise regression coefficients.

5. The model integration system of claim 1, wherein the user interface further comprises additional interface elements for identifying a first analytical function to be added to the electronic data-processing model, identifying a second analytical function to be added to the electronic data-processing model, and indicating a specific attribute from the one or more input attributes whose value controls a selection of the first analytical function or the second analytical function;
wherein the PMML code implements the first analytical function, the second analytical function, and segmentation logic that selects the first analytical function based on the specific attribute having a first value and selects the second analytical function based on the specific attribute having a second value.

6. The model integration system of claim 5, wherein each of the first analytical function and the second analytical function comprises a respective decision tree function.

7. A method comprising:
receiving, by a model integration tool executed by a processing device, an electronic data-processing model that generates an analytical output by applying a function to one or more input attributes weighted with one or more modeling coefficients, respectively, wherein the received electronic data-processing model lacks bin range information associated with the one or more modeling coefficients and reason code information associated with the one or more input attributes;
providing, from the model integration tool to a client computing system, a user interface having interface elements for specifying the bin range information and the reason code information, the user interface having additional interface elements for uploading, to a non-transitory computer-readable medium accessible to the model integration tool, an audit file having an expected analytical output and an expected reason code;
identifying, by the model integration tool and based on user input received via the interface elements, one or more bin ranges for the one or more modeling coefficients and one or more reason codes for the one or more input attributes, wherein each bin range identifies a range of input attribute values for which a respective modeling coefficient is valid, wherein each reason code identifies a respective reason code output indicating a respective impact of a respective weighted input attribute on the analytical output;

generating, by the model integration tool, modeling code that specifies the electronic data-processing model with the one or more bin ranges and the one or more reason codes;

verifying, with the model integration tool, that a test of the modeling code results in a test analytical output matching the expected analytical output and a test reason code matching the expected reason code, the verification comprising accessing the audit file from the non-transitory computer-readable medium and comparing the expected analytical output and the expected reason code stored in the audit file with the test analytical output and the test reason code; and generating, by the model integration tool and subsequent to the verification, an executable source code that implements the electronic data-processing model on a data-processing platform that is accessible by the client computing system, wherein the executable source code is generated from the modeling code.

8. The method of claim 7, wherein the modeling code comprises a specification of the electronic data-processing model in a Predictive Model Markup Language.

9. The method of claim 7, wherein the user interface further comprises one or more additional interface elements for identifying a mapping of the one or more input attributes to one or more production attributes from the data-processing platform and for identifying one or more transformations of one or more respective values of the one or more production attributes into one or more respective values that are compliant with the electronic data-processing model,
wherein the modeling code implements the mapping and the one or more transformations.

10. The method of claim 8, further comprising, prior to verifying that the test analytical output matches the expected analytical output and the test reason code matches the expected reason code:
performing, with the model integration tool, an additional test of the modeling code;
determining, by the model integration tool, that the additional test results in an additional test analytical output that fails to match the expected analytical output or an additional test reason code that fails to match the expected reason code; and
updating, with the model integration tool, the modeling code subsequent to the additional test analytical output failing to match the expected analytical output or the additional test reason code failing to match the expected reason code,
wherein the modeling code as updated results in the test analytical output and the test reason code matching the expected analytical output and the expected reason code.

11. The method of claim 7, wherein the electronic data-processing model comprises a regression model and wherein the one or more modeling coefficients comprise one or more regression coefficients.

12. The method of claim 7, wherein the user interface further comprises one or more additional interface elements for identifying a first analytical function to be added to the electronic data-processing model, identifying a second analytical function to be added to the electronic data-processing model, and indicating a specific attribute from the one or more input attributes whose value controls a selection of the first analytical function or the second analytical function;
wherein the modeling code implements the first analytical function, the second analytical function, and segmentation logic that selects the first analytical function based on the specific attribute having a first value and selects the second analytical function based on the specific attribute having a second value.

13. The method of claim 12, wherein each of the first analytical function and the second analytical function comprises a respective decision tree function.

14. The method of claim 7, wherein the modeling code comprises a specification of the electronic data-processing model in a predictive model interchange format and the executable source code comprises source code to be compiled by the data-processing platform,
wherein the user interface further comprises additional interface elements for:
(i) identifying a mapping of the one or more input attributes to one or more production attributes from the data-processing platform,
(ii) identifying one or more transformations of one or more values of the one or more production attributes into one or more values compliant with the electronic data-processing model,
(iii) uploading, to the non-transitory computer-readable medium accessible to the model integration tool, first PMML code implementing a first decision tree and second PMML code implementing a second decision tree,
(iv) indicating an input attribute whose value controls a selection of the first decision tree or the second decision tree, and
(v) uploading, to the non-transitory computer-readable medium, the audit file having the expected analytical output and the expected reason code,
wherein the modeling code implements the mapping, the one or more transformations, the first decision tree, the second decision tree, and segmentation logic that selects the first decision tree based on the input attribute having a first value and selects the second decision tree based on the input attribute having a second value,
wherein verifying that the test analytical output matches the expected analytical output and the test reason code matches the expected reason code comprises accessing the audit file from the non-transitory computer-readable medium and comparing the expected analytical output and the expected reason code stored in the audit file with the test analytical output and the test reason code,
wherein the method further comprises, prior to verifying that the test analytical output matches the expected analytical output and the test reason code matches the expected reason code:
performing, with the model integration tool, an additional test of the electronic data-processing model using the modeling code,
determining, by the model integration tool, that the additional test results in an additional test analytical output that fails to match the expected analytical output or an additional test reason code that fails to match the expected reason code, and
updating, with the model integration tool, the modeling code subsequent to the additional test analytical output failing to match the expected analytical output or the additional test reason code failing to match the expected reason code,
wherein the modeling code as updated results in the test analytical output and the test reason code matching the expected analytical output and the expected reason code.

15. A non-transitory computer-readable medium having program code of a model integration tool that is executable by a processing device to cause a computing device to perform operations, the operations comprising:

receiving an electronic data-processing model that generates an analytical output by applying a function to one or more input attributes weighted with one or more modeling coefficients, respectively;

providing, to a client computing system, a user interface having interface elements for specifying bin range information associated with the one or more modeling coefficients and reason code information associated with the one or more input attributes, the user interface having additional interface elements for uploading, to a memory device that is at least one of the non-transitory computer-readable medium or an additional non-transitory computer-readable medium accessible to the model integration tool, an audit file having an expected analytical output and an expected reason code;

identifying, based on input received via the interface elements, one or more bin ranges for the one or more modeling coefficients and one or more reason codes for the one or more input attributes, wherein each bin range identifies a range of input attribute values for which a respective modeling coefficient is valid, wherein each reason code identifies a respective reason code output indicating a respective impact of a respective weighted input attribute on the analytical output;

generating Predictive Model Markup Language (PMML) code that specifies the electronic data-processing model with the one or more bin ranges and the one or more reason codes;

verifying that a test of the PMML code results in a test analytical output matching the expected analytical output and a test reason code matching the expected reason code, the verification comprising accessing the audit file from the memory device and comparing the expected analytical output and the expected reason code stored in the audit file with the test analytical output and the test reason code; and generating, subsequent to the verification, an executable source code that implements the electronic data-processing model on a data-processing platform that is accessible by the client computing system, wherein the executable source code is generated from the PMML code.

16. The non-transitory computer-readable medium of claim 15, wherein the user interface further comprises additional interface elements for identifying a mapping of the one or more input attributes to one or more production attributes from the data-processing platform and for identifying one or more transformations of one or more respective values of the one or more production attributes into one or more values that are compliant with the electronic data-processing model, wherein the PMML code implements the mapping and the one or more transformations.

17. The non-transitory computer-readable medium of claim 15, wherein the user interface further comprises one or more additional interface elements for identifying a first analytical function to be added to the electronic data-processing model, identifying a second analytical function to be added to the electronic data-processing model, and indicating a specific attribute from the one or more input attributes whose value controls a selection of the first analytical function or the second analytical function;

wherein the PMML code implements the first analytical function, the second analytical function, and segmentation logic that selects the first analytical function based on the specific attribute having a first value and selects the second analytical function based on the specific attribute having a second value.

* * * * *